UNITED STATES PATENT OFFICE.

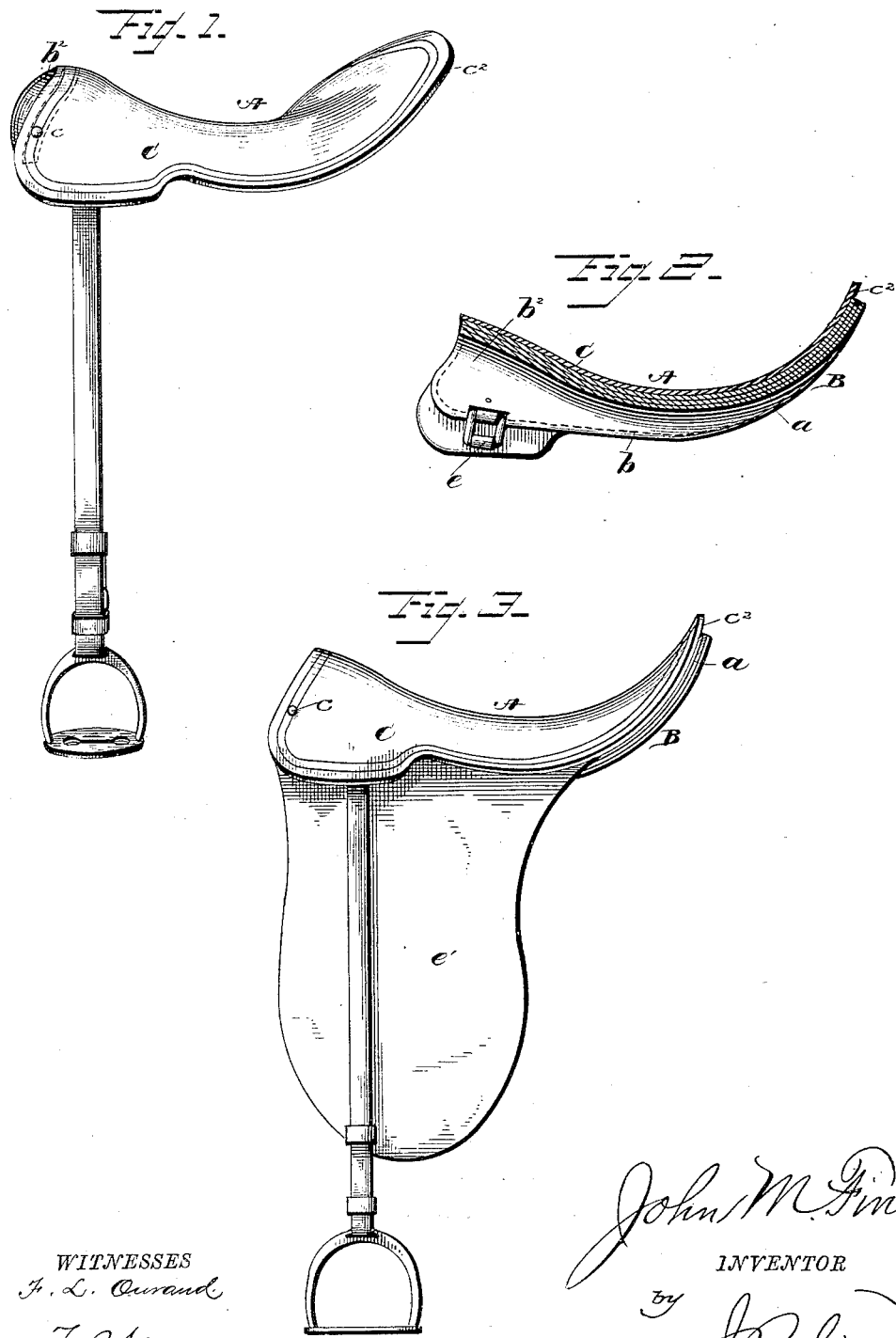

JOHN M. FINK, OF LOUISVILLE, KENTUCKY, ASSIGNOR OF ONE-HALF TO HENRY B. FELDHAUS, OF SAME PLACE.

RIDING-SADDLE.

SPECIFICATION forming part of Letters Patent No. 318,610, dated May 26, 1885.

Application filed January 2, 1885. (No model.)

*To all whom it may concern:*

Be it known that I, JOHN M. FINK, a citizen of the United States, residing at Louisville, in the county of Jefferson and State of Kentucky, have invented certain new and useful Improvements in Saddles; and I do hereby declare that the following is a full, clear, and exact description of the invention, which will enable others skilled in the art to which it appertains to make and use the same.

My invention relates to riding-saddles; and it has for its object to provide a saddle which shall be cheap and simple in its construction, strong and durable in use, and one that will retain its shape and afford a comfortable seat for the user.

The invention consists in the improved construction and combination of parts hereinafter fully described, and pointed out in the claim.

In the drawings, Figure 1 is a perspective view of a saddle constructed in accordance with my invention. Fig. 2 is a vertical longitudinal section of the same. Fig. 3 is a side elevation of a modification.

In the accompanying drawings, in which like letters of reference indicate corresponding parts in all the figures, A represents a saddle embodying my invention. B represents the tree thereof, which is composed of a layer or layers of leather, $a$, sewed together, preferably at the edges of the same. The strips or layers composing the tree may be composed of two sections, if desired, and sewed together, as shown at $b$. The said tree B has a concave upper face, and the cantle is well turned up, as shown, to form an easy and comfortable seat. The forward end of the tree has a convex upper face, as at $b^2$, and is so formed as to fit the back of the horse snugly, and in such manner that it will not rub the same. Near the forward end of the tree, but at the lower ends of the sides of the same, are secured buckles $e$, for the attachment of the stirrup-straps.

Upon the upper side of the tree is provided the seat-cover C, which may be quilled or plain, as desired or found preferable. The said seat-cover is secured to the tree in any suitable manner; but in the present instance it is shown secured to the tree at the forward end thereof by headed tacks $c$, and the remainder of the cover secured to the tree by an adhesive substance. The edges $c^2$ of the cover are extended beyond those of the tree in order to hide the same from view, to render the saddle more attractive in appearance.

For retaining the saddle in shape and strengthening the same, I may, if desired, locate a gullet-plate on the under side of the tree, at the forward end thereof, or in the cantle, or I may use them at both points.

In the modification shown in Fig. 3 the seat-cover is extended, near its forward end, out upon its sides to form protecting flaps or skirts $e'$.

The above-described saddle is cheap and simple in its construction, easy to manufacture, is strong and durable, and will retain its shape.

I claim as my invention and desire to secure by Letters Patent—

The herein-described improved riding-saddle, consisting of the leather tree formed entirely of layers of leather sewed together, the leather seat-cover conforming to and secured over the tree by means of headed tacks at its forward end, and having the remainder secured by an adhesive substance, the seat-cover being extended beyond the edges of the tree to protect and hide the same, and projecting below the tree at the forward ends to cover the stirrup-connections, as described, and for the purpose set forth.

In testimony whereof I affix my signature in presence of two witnesses.

JOHN M. FINK.

Witnesses:
A. YOUNG,
H. HUKENBECK.